May 27, 1924.

W. E. CHADWICK ET AL 1,495,883

THEFT WARNING SIGNAL FOR VEHICLES

Filed Feb. 7, 1922

WITNESSES.

INVENTORS.

Patented May 27, 1924.

1,495,883

UNITED STATES PATENT OFFICE.

WILLIAM E. CHADWICK AND JOHN A. CREIGHTON, OF LOS ANGELES, CALIFORNIA, ASSIGNORS TO ED. WESTBERG, OF LOS ANGELES, CALIFORNIA.

THEFT-WARNING SIGNAL FOR VEHICLES.

Application filed February 7, 1922. Serial No. 534,797.

*To all whom it may concern:*

Be it known that we, WILLIAM E. CHADWICK and JOHN A. CREIGHTON, citizens of the United States, residing at Los Angeles, in the county of Los Angeles and State of California, have invented a new and useful Improvement in Theft-Warning Signals for Vehicles, of which the following is a specification.

Our invention relates to improvement in theft warning signals for vehicles and has for its object to provide means whereby a warning signal may be attached to the wheel of a vehicle in such a way as to make its removal difficult to anyone not possessing the necessary tools or knowledge to make the removal easily. Our invention relates more particularly to means for locking such a signal to the disc type of vehicle wheel in which there are no convenient openings through which a positive connection can be made between the parts of such a signal around the rim or tire of the vehicle wheel. Our invention, while especially adapted to be locked around the disc type of wheel, may also be locked to the ordinary type of spoke wheel.

The invention consists in the novel and useful construction, arrangement and combination of parts, all as herein described, as shown in the drawings herewith, and as hereinafter pointed out in the claims.

In the accompanying drawing—

Corresponding parts throughout the drawing are designated by the same reference numerals.

In the embodiment of the invention shown in the accompanying drawing, A is a rigid curved arm hingedly joined to another rigid curved arm, B, the two arms, A and B, being adapted to partially encircle the tire, $c$, and rim, $c'$, and to bear against the disc portion, $c''$, of the wheel, C. A locking means, D, is provided for holding the arms in the position desired.

Figures 1, 2:
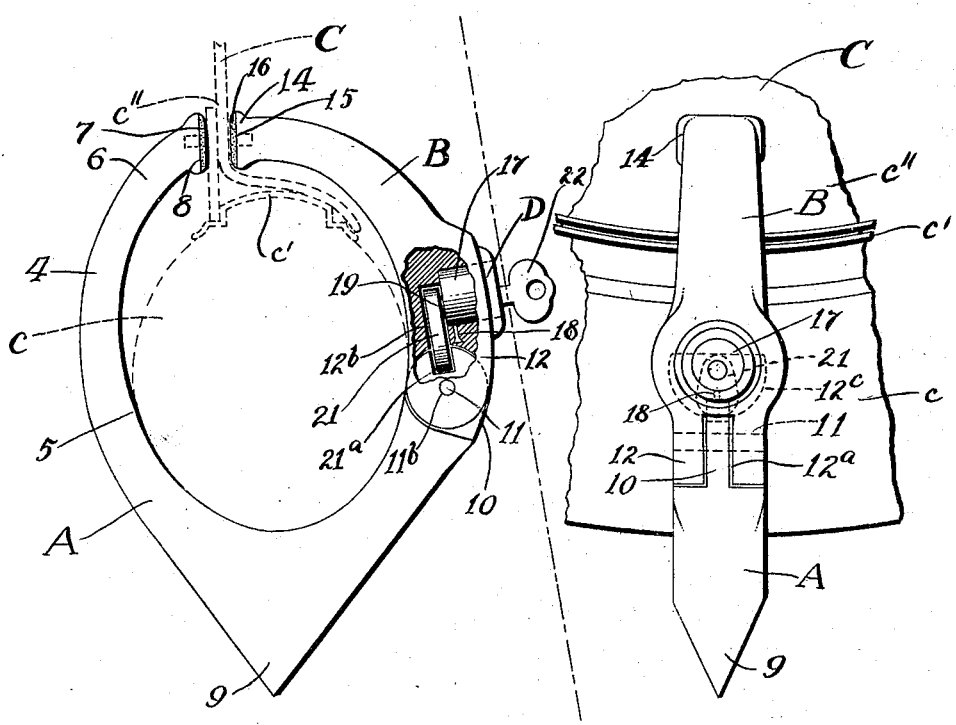
Figure 1 is a front elevation of the device, parts being broken away and in section.
Fig. 2 is a side elevation of a portion of the improved device shown applied to a part of a wheel tire and disk wheel.

The arm, A, is a rigid hook-shaped member, preferably of steel, adapted to partially encircle the tire, $c$, and rim, $c'$, with a curved portion, 4, preferably having its concave surface touching the tire, $c$, as at 5, and one end, 6, adapted to bear against the disc, $c''$, of the wheel, C. A pad, 7, of yielding material may be attached to the end, 6, as at 8, to prevent the marring of the enamel or plating on the disc. A projecting point, 9, is formed on the arm, A, so as to protrude substantially as in Figure 2, from the periphery of the tire, $c$, when the device is in place on the wheel, C. The point, 9, is for the purpose of striking the pavement and lifting the vehicle as the wheel rotates, thus producing a noise and attracting the attention of passers-by, at the same time leaving an easily followed trail, due to the action of the point 9 on the roadway, should a theft be effected in spite of the noise produced.

Figure 3:
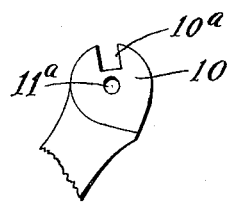
Figure 3 is a detail of a portion of the device.

The opposite end of the arm, A, is shaped as best shown in Figure 3, having a rounded and flattened portion, 10, slotted on its periphery, as at $10^a$, and drilled, as at $11^a$, for a hinged pin, 11, providing for a hinged connection with arm, B. Hinge pin, 11, is also received in hole, $11^b$, drilled in the bifurcated end, 13, of arm, B, and may be welded or fixed therein in assembly with arm A. Portion, 10, of arm, A, is received in the slot $12^a$ of the end 13. Adjacent the end, 13, of arm, B, is a cavity, as at $12^b$, formed in the body of the arm, and in which locking means, D, is inserted. The opposite end, 14, of arm B is formed as at 15, and to it a pad, 16, similar to pad, 7, and for a like purpose, may be attached. When the signal is attached to a wheel, pads 7 and 16 come opposite each other and with sufficient aperture between them to accommodate the disc, $c''$, and are locked in that position by the locking means, D, hereinafter described.

Locking means D consists of a lock barrel, 17, of well known construction, held in place in the cavity at $12^b$ by a pin or screw 18, let into the arm B from the inner surface of the slot $12^a$. Said pin or screw, 18, may be welded or brazed over, so as not to be readily accessible for tampering with the locking means D. Attached to the shaft, 19, of the lock barrel, 17, is a locking bar, 21, which oscillates in the semicircular portion, $12^c$, of the cavity $12^b$. The slot at $10^a$ and the semicircular portion, $12^c$, of the cavity, $12^b$, are so situated that when pads 7 and 16 are in contact with the wheel disc, $c''$, the slot at $10^a$ is in alignment with the portion $12^c$ of cavity $12^b$. Hence, when the arms are in the aforesaid position, locking bar, 21, may be rotated through the slot at $10^a$ by means of the key 22, and the mechanism of the lock barrel 17 may be so arranged that when the bar 21 is in the position shown in the drawing, the key, 22, may be withdrawn and the mechanism of the lock barrel, 17, will hold the bar in that position. The face $21^a$ of the bar 21, will bear against the sides of the slot at $10^a$ and prevent any relative movement of the arms A and B. The signal device is thus locked against removal from the wheel. The ends 6 and 14 bearing against the disc, $c''$ prevent the rotation of the signal around the tire $c$ and rim $c'$. When in place on other types of vehicle wheels, the ovular form of the opening between the arms and the substantially ovular form of the tire and rim will prevent rotation of the device about the tire and rim.

It is obvious that many changes and modifications may be made in practicing my invention without departing from the true spirit and scope thereof.

Having thus disclosed our invention, we claim and desire to secure by Letters Patent:

1. A device of the class specified, comprising tire embracing arms differing in length and having ends pivotally connected to form a hinge, the longer arm having a lower projecting point, and locking means located adjacent to the hinge and consisting of a fixed terminal flat disk carried by the longer arm and having a transverse slot through the periphery thereof, the shorter arm having a slot in its end to receive said disk and also having therein an eccentrically mounted oscillatable locking device, said locking device being disposed at right angles to the flat disk and movable through the peripheral slot of the latter.

2. A device of the class specified, comprising tire embracing arms differing in length and having ends movably associated to form a hinge connection, the longer arm having a projecting point, and locking means carried by the arms at the hinge connection and respectively including a rigid disk with a peripheral slot located at the terminal of the longer arm, the slot of the disk being above the means for connecting the arm ends, and the shorter arm provided with an oscillatable eccentrically mounted locking member located above and operable at right angles to and movable through the peripheral slot of the disk.

3. A device of the class specified comprising tire-embracing arms having ends respectively formed with a slot and a flat rigid disk member to movably engage the slot, and an oscillatable member movable in the arm having the slot and in a plane at right angles to the disk at the end of the other member and also through the slot of the said disk.

4. A device of the class specified comprising tire-embracing arms pivotally connected to form a hinge, the pivotal connection being provided by a flat disk formed at the terminal of one arm and having a transverse slot opening through the periphery thereof and a slot in the terminal of the other arm in which said disk is movably fitted, and a locking device with opposite flat faces carried by the arm having the slot to receive the disk and disposed to oscillate in planes at right angles to the disk and through the slot of the latter to bring the flat faces in planes at right angles to the disk slot as a reinforcing means for the hinge connection and obstruct opening of the arms when the latter are locked.

5. A device of the class specified comprising tire-embracing arms having ends pivotally connected to form a hinge connection, the end of one arm being slotted and the end of the other arm formed as a flat disk to movably fit in the slotted end of the adjacent arm, and an eccentrically mounted key-operated oscillatable device mounted in the arm having the slotted end and movable in a plane at right angles to and through the periphery of the disk of the remaining arm.

6. A device of the class specified comprising tire-embracing arms, one of the said arms being of greater continuous construction than the other and having a lower integral projecting point and the other arm materially shorter than the point-carrying arm and hinged to the latter at a distance from said point so as to bring the hinge connection of the two arms at one side of the device as a whole, and an eccentrically mounted key-operated locking device mounted in the shorter arm and movable in a plane at right angles to the opening movement of the latter arm to engage and release the terminal locking part of the remaining longer arm.

7. A device of the class specified comprising tire-embracing arms of different lengths, the longer arm having a lower integral projecting point and the shorter arm hinged to a part of the longer arm at a distance above the said point, and key-operated locking means oscillatably mounted in the shorter arm to move in a plane at right angles to and engage a portion of the hinge means at the adjacent end of the longer arm to set up a maximum resistance to movement of the shorter arm relatively to the longer arm in a plane at right angles to the opening and closing actuation of said shorter arm.

8. A device of the class specified, comprising a comparatively short arm and a longer arm having a lower projecting point with an upwardly rigidly projecting portion above the point, the arms having interfitting ends pivotally connected to form a hinge joint, the longer arm being provided with a projecting member having a slot at the upper portion thereof and the other arm having an oscillatable key-operated device transversely movable through the slot of the said projecting member of the longer arm adjacent thereto to prevent movement of the shorter arm and locate the hinge connection and locking means of the two arms at a considerable distance from the lower projecting point.

In testimony whereof we have hereunto set our hands in the presence of two subscribing witnesses.

WILLIAM E. CHADWICK.
JOHN A. CREIGHTON.

Witnesses:
P. B. ROBINSON,
R. R. ROBINSON.